United States Patent [19]

Coutant et al.

[11] 3,841,721
[45] Oct. 15, 1974

[54] BEARING CARTRIDGE ASSEMBLY

[75] Inventors: Ralph W. Coutant, Ho-Ho-Kus;
Frederick Schlueter, Rahway, both of N.J.

[73] Assignee: Litton Systems Inc., Passaic, N.J.

[22] Filed: June 2, 1970

[21] Appl. No.: 42,623

[52] U.S. Cl. .................................. 308/20, 193/37
[51] Int. Cl. ............................................ F16c 35/00
[58] Field of Search ............ 308/20, 207, 208, 210, 308/212, 213, 189, 190, 191; 193/35, 37; 198/192; 29/116

[56] References Cited
UNITED STATES PATENTS

| | | | |
|---|---|---|---|
| 1,876,534 | 9/1932 | Adams | 193/37 |
| 2,074,901 | 3/1937 | Gotthardt | 308/20 X |
| 2,757,988 | 8/1956 | Lecourbe | 308/20 |
| 2,768,725 | 10/1956 | Foulds et al. | 193/37 |
| 3,428,373 | 2/1969 | Imse | 308/20 |

Primary Examiner—Manuel A. Antonakas
Assistant Examiner—Barry Grossman
Attorney, Agent, or Firm—Morris I. Pollack

[57] ABSTRACT

A bearing cartridge assembly for idler rolls and the like is disclosed, wherein the roll head and prefabricated bearing cartridge cooperate in such a manner that a negligible radially inward force is applied to the bearing within the cartridge as a result of the press fit between the roll head and the bearing cartridge. This permits a heavy press fit between the roll head and the bearing cartridge without the need for maintaining strict bearing tolerances to prevent the binding of the bearing. The prefabricated bearing cartridge has a light gauge housing and is designed so that the support of the cartridge within the roll is accomplished through a press fit between the cartridge housing and roll head on either side of the bearing within the cartridge.

3 Claims, 3 Drawing Figures

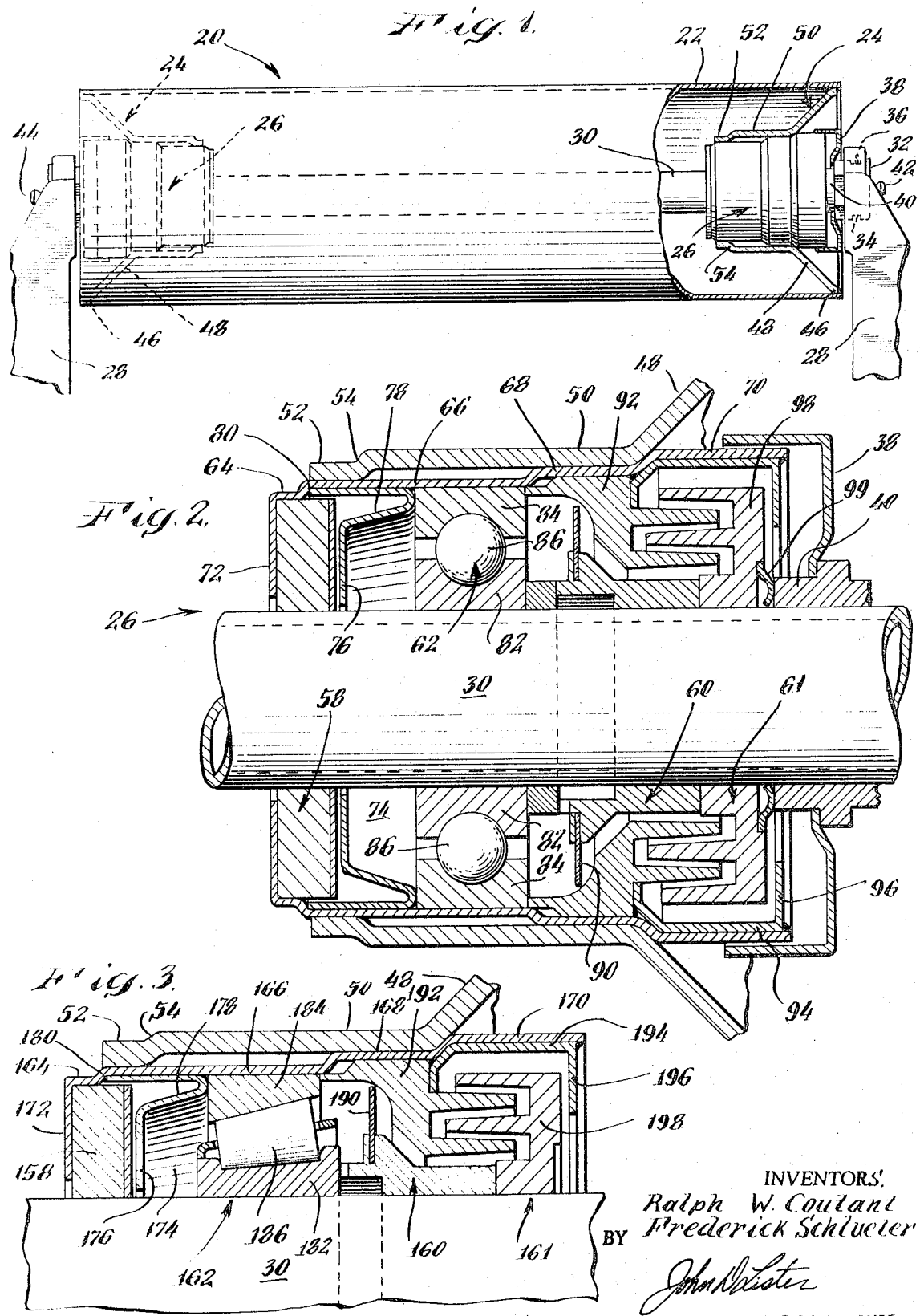

BEARING CARTRIDGE ASSEMBLY

BACKGROUND OF THE INVENTION

The present invention relates to bearing assemblies for idler rolls and the like and in particular to bearing cartridge assemblies wherein prefabricated bearing cartridges are retained within the roll head by means of a press fit without the forces generated by the press fit being transferred in any substantial degree to the bearing within the cartridge.

Prefabricated bearing assemblies for idler rolls, conveyor rollers and other tubular members are known in the art as evidenced by the U.S. Pat. Nos. to Gotthardt, 1,856,547, issued May 3, 1932; Adams, 1,876,534, issued Sept. 13, 1932; Foulds et al., 2,768,725, issued Oct. 30, 1956; and Honroth, 3,250,581, issued May 10, 1966, which disclose prefabricated bearing cartridges having metallic housings. These bearing cartridges are retained within the rolls either by press fits or by deforming the ends of the roll. However, where a press fit has been utilized to retain a bearing cartridge within a roll head, the bearing assemblies have not been designed to prevent the forces of the press fit from being transferred directly to the bearing within the cartridge. Consequently the respective external and internal diametral tolerances of the cartridges and the roll heads must be strictly maintained within narrow limits to prevent the forces generated by the press fits between a cartridge and the roll head from interfering with the performance of the bearing within the cartridge by reducing the clearances between the balls or rollers and the bearing races.

The present invention, through the use of an unique stepped diameter, prefabricated bearing cartridge and complementary stepped diameter roll head, solves the problems of the prior art by permitting a heavy press fit between the cartridge and roll head without transferring the forces resulting from the press fit to the bearing within the cartridge. As a result, the cartridge housing can be rigidly retained within the roll head and can be made of a light gauge metal reducing both material and fabrication costs. The external and internal diametral tolerances of the thin gauge bearing cartridge and the internal diametral tolerance of the relatively rigid roll head can have a wide range such as the tolerances associated with commercial drawn parts. Furthermore, since the roll head serves as an adaptor for the cartridge, a standardized cartridge can be used with rolls of various diameters, thereby reducing the consumer's spare parts inventory and facilitating the initial assembly or replacement of bearings in idler rolls and the like.

BRIEF DESCRIPTION OF THE INVENTION

A bearing cartridge assembly for idler rolls and the like is provided, which includes a roll head that is affixed to the interior of the idler roll, regardless of the roll diameter, and adapted to carry a standardized prefabricated bearing cartridge. The roll head and cartridge housing are both stepped in diameter, with their diameters becoming progressively smaller, with each step, from their outer to their inner ends. However, the respective inside diameters of the roll head and outside diameters of the cartridge are such that selected portions of these members form interference or press fits and cooperate to retain the prefabricated bearing cartridge in place once it has been inserted within the roll head.

The housing of the bearing cartridge is made of light gauge metal with a roller or ball bearing being retained at a specific axial location within the cartridge by annular retaining members which engage the side faces of the outer bearing race. The press fit between the cartridge and the roll head is effected by locating the interference surfaces of the relatively rigid roll head and the thin gauge cartridge housing on either side of the bearing and providing an annular gap between the inner surface of the roll head and the outer surface of the cartridge at the location of the bearing. Since the cartridge housing is a light gauge metal the forces generated by the press fit between the roll head and the cartridge are absorbed by the cartridge housing and the forces, if any, transferred to the bearing from the press fit are negligible.

The above objects and advantages of the present invention will become more apparent and other objects and advantages of the present invention will become apparent from the following detailed description when taken in conjunction with the accompanying drawings wherein:

FIG. 1 is a longitudinal view of a typical idler, utilizing the bearing cartridge assembly of the present invention with portions of the idler broken away for illustrative purposes to show the roll head in combination with the cartridge insert;

FIG. 2 is an axially extending sectional view of a prefabricated bearing cartridge with a ball bearing mounted therein; and FIG. 3 is an axially extending fragmentary view, similar to FIG. 2, of a prefabricated bearing cartridge with a roller bearing mounted therein.

DETAILED DESCRIPTION OF THE INVENTION

Referring now to the drawings and in particular to FIG. 1, an idler roll assembly 20 is illustrated which utilizes one of the preferred embodiments of the present invention. As shown, the assembly 20 includes a tubular shell 22, roll heads 24 and bearing cartridges 26, which are mounted on idler supports 28 by means of a dead shaft 30.

The shell 22, support brackets 28 and hollow shaft 30 are all of standard construction and therefore will not be discussed in great detail. However, each end of the shaft 30 is retained in its respective support bracket 28 by means of a hexagonal nut 32 having an annular groove 34 in its outer surface that is received within a complementary open ended slot of the bracket 28. The bracket slot extends down from the upper edge of the bracket and is provided with a cotter pin 36 which passes through bracket 28 and the area above the hexagonal nut, defined by groove 34, thereby retaining the shaft 30 within the slot.

To prevent dust from entering the cartridge assembly, an annular dust shield 38 is provided intermediate the hexagonal nut 32 and the end face of the cartridge 26. This dust shield is retained in place by being press fit onto a shoulder 40 located on the inner face of the hexagonal nut.

To provide lubricant for each bearing cartridge, conventional grease and pressure release fittings 42, 44 are mounted in the ends of shaft 30. Axially and radially extending ducts (not shown) within the shaft 30 lead to the interior of the bearing cartridges and direct the lubricant to the bearings.

The roll heads 24 of the idler assembly are preferably metallic (e.g., drawn steel) and are provided with annular portions 46, which are welded or otherwise rigidly affixed to the interior surface of shell 22 adjacent the ends of the shell. Each roll head extends axially and radially inward from the shell forming a frusto-conical shaped portion 48 after which the head extends axially forming first and second tubular cartridge retaining portions 50 and 52 which are separated by a shoulder 54. The outermost portion 46 has an external diameter substantially equal to the internal diameter of shell 22 while the inner portions 50 and 52 have internal diameters which form press fits with bearing cartridges 26 as will be more fully explained hereinafter. With this construction the roll head 24 serves as an adaptor for adapting the bearing cartridge to roll shells 22 of different diameters. Consequently a standardized bearing cartridge 26 can be used with a series of idler roll shells having different diameters.

Turning now to FIG. 2, a prefabricated ball bearing cartridge assembly 26 is illustrated in section along with a portion of roll head 24. The bearing cartridge includes a cage or housing 56, inner and outer grease seals 58 and 60, labyrinth seals 61 and a ball bearing assembly 62. The housing 56 is formed with a series of stepped cylindrical portions 64, 66, 68 and 70 with each successive portion having a greater internal and external diameter than the adjacent inner portion. The inner end of innermost portion 64 terminates in a radially extending, annular seal retaining flange 72 having a central opening therein, greater in diameter than the diameter of shaft 30. While in the preferred form the housing 56 is made of a thin gauge metal (e.g. steel), it can also be fabricated from other suitable materials if desired.

Sealing ring 58 abutts the outwardly facing, radially extending surface of the flange 72 and is maintained in contact with flange 72 by an annular retaining member 74. In its preferred form the seal 58 is a laminated rubber/felt seal which rotates with housing 56 and engages shaft 30. However, it is contemplated that equivalent sealing members can be substituted for seal 58 if desired or necessitated.

Retaining member 74 which also serves as a spacing member to maintain bearing 62 in a fixed axial position within the cartridge, is positioned between seal 58 and bearing 62. The retaining and spacing member 74 has a radially, inner annular section 76 which engages the outwardly facing surface of the seal 58; a radially outer axially extending spacing rib 78 with an apex that engages the inwardly facing surface of the bearing 62; and a terminal portion 80 which engages an annular shoulder of the bearing cartridge housing that is located intermediate portions 64 and 66 of the housing. Although other equivalent spacers made of equivalent materials can be used, the retaining member 74 is preferably made of steel and has a central opening therein, greater in diameter than shaft 30 so that the rotation of the member does not impair the function of the cartridge assembly by contacting the stationary shaft.

The ball bearing 62, which can be any one of numerous conventional roller bearings, has a radially inner race 82 adapted to receive shaft 30, a radially outer race 84 which is press fit and retained within portion 66 of the bearing cartridge housing and ball elements 86 interposed between the races to permit relative rotation between the inner and outer races. In the embodiment shown, bearing race 84 rotates with the cartridge housing 56 while bearing race 82 is mounted on shaft 30. Of course it is to be understood that the bearing cartridge assembly can be used in assemblies where the outer race is stationary and the inner race rotates.

The outer grease seal 60 is mounted on shaft 30 and carries a radially extending lip 90 which cooperates with the labyrinth seal 61 to help prevent grease seepage from the bearing 62 or the penetration of dust, grit and moisture into the bearing. The seal also cooperates with the shaft 30 to define an annular chamber with radially extending ports for supplying lubricant to the bearing 62.

The labyrinth seal 61 is located adjacent the bearing with the inner end of the radially outer rotating labyrinth 92 abutting the outer surface of bearing race 84. Rotating labyrinth 92 is retained in position and held against race 84 by an annular labyrinth retaining member 94, which is welded or otherwise suitably affixed to the interior of the housing. The retaining member 94 is formed of steel or other equivalent materials and conforms to the contour of housing portion 70 and the shoulder intermediate housing portions 68 and 70. A radially depending portion 96 of member 94 serves both as a dust shield and a retaining means for the inner stationary labyrinth member 98 which is received on shaft 30 and urged inwardly by leaf spring washer 99. The axially extending flanges of the inner and outer labyrinth members overlap each other to form an outer seal for the bearing cartridge. As can be seen from the above with member 74 and seal 61 axial movement of the bearing is prevented and the bearing 62 is maintained in its desired location within the housing.

FIG. 3 illustrates another preferred embodiment of the present invention with the corresponding components of this embodiment and the embodiment of FIG. 2 bearing reference characters in which the last two digits are the same. To distinguish the reference characters of the two embodiments, the reference characters of FIG. 3 are preceeded by the numeral one. The above is to avoid unnecessary repetition in the detailed description and it is to be understood that the description of the embodiment of FIG. 2 applies to the embodiment of FIG. 3, except for the distinctions noted below.

In the embodiment of FIG. 3, a roller bearing 162 is substituted for bearing 62. As with bearing 62, bearing 162 is maintained in place by retaining member 174 and labyrinth seal member 192.

The outside diameters of housing portions 66, 166 and 68, 168 are equal to or greater than the internal diameters of roll head portions 52 and 50 respectively whereby when cartridges 26 or 126 are inserted into roll heads 24 a press fit is formed between these cooperating portions. With this construction there is no contact between housing portion 66 where ball bearing 62 is retained and roll head portion 50, nor is there any contact between housing portion 166 where the roller bearing 162 is retained and roll head portion 50.

To insure that portion 52 of the roll head 24 does not engage portion 66 of cartridge 26 at the location of bearing 62 or portion 166 of cartridge 126 at the location of bearing 162, the shoulders of cartridges 26, 126 between portions 68 and 70 or 168 and 170 cooperate with the frusto-conical surface of roll head portion 48 to limit the extent that the cartridge can be inserted into the roll head. Since the distance from the inner end of frusto-conical portion 48 to portion 52 is greater than the distance from the shoulder between cartridge housing portions 68, 70 or 168, 170 and the inner faces of bearings 62 or 162, the roll head portions 52 cannot engage the cartridge housing at the location of bearings 62 or 162 even when the respective cartridge is fully inserted into the head.

With the above construction, prefabricated cartridge bearing assemblies 26, 126 can be readily inserted into the roll heads 24 of idler rolls and the like and retained there by means of a heavy interference or press fit between the roll heads 24 and the bearing cartridge assembly 26 or 126. Since the heavy press fit is effected on either side of the bearing 62 or 162, an annular gap being located intermediate the cartridge housing and the roll head in the area of bearings 62 or 162, and since the cartridge housing is made of a light gauge metal, the forces from the press fit are not transferred to the bearings 62 or 162, where they could increase the friction between the components within the bearing or otherwise impair the function of the bearing. In a similar manner, the press fit of the bearing 62 or 162 into the cartridge housing does not adversely affect the performance of the bearing since the light gauge metal housing yields to a much greater extent than the thick bearing race. Consequently, with the present invention, there is no need to maintain the strict external diameter bearing tolerances normally required when press fits are utilized to retain bearing assemblies within idler rolls and the like, nor is there a need to maintain strict external and internal diametral tolerances for the bearing cartridge housing and the roll head. Thus, the present invention enables the use of less expensive bearings for idler rolls and simplifies idler fabrication or bearing replacement through the use of a standardized, prefabricated bearing assembly which can be adapted through the roll head to fit roll shells of various diameters.

While a preferred form of the invention has been set forth above, it is to be understood that all suitable modifications and equivalents, can be resorted to, which fall within the scope of the invention as defined in the following claims.

What is claimed is:

1. In a roll assembly having a roll shell, a bearing cartridge assembly comprising: roll head means for retaining a bearing cartridge means and for adapting said bearing cartridge means to fit within the roll shell; bearing cartridge means, said bearing cartridge means having bearing means mounted therein and said bearing cartridge means having means which cooperate with said bearing means to limit the axial movement of said bearing means with respect to said bearing cartridge means; said roll head means and said bearing cartridge means having stepped internal and external diameter portions respectively, whereby said roll head means and said bearing cartridge means have complementary surfaces on either side of said bearing means, said complementary surfaces engaging each other and cooperating to frictionally retain said bearing cartridge means within said roll head means; and said stepped internal and external diameter portions of said roll head means and said bearing cartridge means defining an annular space therebetween located radially outward with respect to said bearing means and extending axially a distance at least as great as the width of said bearing means thereby preventing the transfer of the forces caused by the frictional engagement between said complementary surfaces of said roll head means and said bearing cartridge means from being transferred to said bearing means.

2. In the roll assembly of claim 1: said roll head means having an external diameter substantially equal to the internal diameter of said shell, and said roll head means being affixed to said shell.

3. In the roll assembly of claim 1: said bearing means having radially inner and outer race means with friction reducing elements therebetween, said radially inner and outer race means being rotatable relative to each other and said radially inner race means being adapted to receive a shaft therethrough.

* * * * *